(12) United States Patent
Lovtsus

(10) Patent No.: US 9,102,538 B2
(45) Date of Patent: Aug. 11, 2015

(54) METHOD FOR PRODUCING POLYCRYSTALLINE SILICON

(76) Inventor: Andrey Algerdovich Lovtsus, Saint-Petersburg (RU)

( * ) Notice: Subject to any disclaimer, the term of this patent is extended or adjusted under 35 U.S.C. 154(b) by 1225 days.

(21) Appl. No.: 12/993,534

(22) PCT Filed: Apr. 20, 2009

(86) PCT No.: PCT/RU2009/000185
§ 371 (c)(1),
(2), (4) Date: Jan. 17, 2011

(87) PCT Pub. No.: WO2009/142538
PCT Pub. Date: Nov. 26, 2009

(65) Prior Publication Data
US 2011/0104035 A1    May 5, 2011

(30) Foreign Application Priority Data
May 22, 2008 (RU) ................................ 2008121922

(51) Int. Cl.
*C01B 33/03* (2006.01)
*C01B 33/027* (2006.01)
*C01B 33/035* (2006.01)
*C01B 33/107* (2006.01)

(52) U.S. Cl.
CPC ............... *C01B 33/03* (2013.01); *C01B 33/027* (2013.01); *C01B 33/035* (2013.01); *C01B 33/10773* (2013.01); *B01J 2219/0004* (2013.01)

(58) Field of Classification Search
CPC   C01B 33/03; C01B 33/027; C01B 33/10773; C01B 33/035; B01J 2219/0004
USPC ................................................... 423/348–350
See application file for complete search history.

(56) References Cited

U.S. PATENT DOCUMENTS

2008/0044337 A1 *   2/2008   Fallavollita ................... 423/349

FOREIGN PATENT DOCUMENTS

| JP | 2005314191 A * 11/2005 |
| WO | WO 2006110481 A2 * 10/2006 |

* cited by examiner

*Primary Examiner* — Anthony J Zimmer

(57) ABSTRACT

The invention relates to a polycrystalline silicon production method. The inventive method involves supplying a gas mixture based on a silicon-containing gas to a reduction reactor via a tube system and precipitating silicon on heated surfaces in such a way that an effluent gas mixture is formed. The silicon precipitation process is simultaneously carried out in at least two reactors which are connected in series by the tube system for transporting the gas mixture. Then, the gas mixture used for the operation of all the reactors is supplied at entry into the first reactor and is continuously transmitted through all the connected in series reactors.

9 Claims, No Drawings

METHOD FOR PRODUCING POLYCRYSTALLINE SILICON

FIELD OF THE INVENTION

The present invention relates to the methods for production of polycrystalline silicon, in particular the method for production polycrystalline silicon by means of deposition from silicon-bearing gas mixtures on heated surfaces, for instance in Siemens process, is considered.

BACKGROUND OF THE INVENTION

WO2006110481 <<Production of polycrystalline silicon>> discloses the method wherein polysilicon is suggested to deposit onto hollow bodies. The hollow bodies replace slim rods in a conventional Siemens-type reactor and may be heated internally by resistance elements. The diameter of hollow bodies is selected to provide the deposition surface area much larger than that of silicon slim rods.

However, the profitability of this method is reduced by use of the additional expensive equipment and complicated electrical systems. Besides, the productivity of this method cannot be considerably increased since the deposition occurs from the gas mixture, which is the same as that leaving the reactor.

A method of polycrystalline silicon production from a gas phase is also known (U.S. Pat. No. 6,544,333, filling date Apr. 24, 2001, publication date Feb. 7, 2002 <<Chemical vapor deposition system for polycrystalline rod production>>), which comprises supply of a silicon-bearing gas through a system of pipes into the reactor, where silicon is deposited on surfaces heated by induction coils with production of output gases.

Such method of rod heating allows increasing the rod surface temperature, final rod diameter, and, thereby, the productivity becomes higher. However, the required apparatus and its electrical system are extremely complicated and expensive.

Both these methods have one common important disadvantage: the input gas is mixed with the products of silicon deposition reactions in the reactor vessel and silicon deposits from depleted mixture as compared with the supplied gas. Silicon grows from the mixture being the product of the process, and, hence, the reactor characteristics such as productivity, energy consumption, and gas-to-silicon conversion become worse.

DISCLOSURE OF THE INVENTION

Suggested method is aimed at creating highly efficient polycrystalline silicon production process via increasing the reactor productivity, silicon conversion from the feeding gas mixture, and reducing the energy consumption.

In the proposed method a gas mixture containing silicon-bearing gas mixture is supplied into reactors through a pipe system. Silicon deposition occurs at the surface of heated bodies and is accompanied by formation of gas mixture containing reaction products in the reactor volume. At least two reactors are used simultaneously for silicon deposition: the reactors connected by a pipe system as one after another and the feeding gas mixture is transported through these reactors during the common production process. Order of the silicon-bearing gas transportation through the reactors is changed to the opposite one at least once during the process.

Practically, polycrystalline silicon is produced at the plants equipped with numerous reactors and, hence, the suggested way of reactor connection is possible and expedient.

DETAILED DESCRIPTION

Feeding gas supply through pipe systems is aimed at increase of the turbulent flow intensity in the reactors, transportation of richer gas mixture to the growing surfaces, and, hence, results in an increase of the silicon deposition rate. At that, the supplied gas mixes with the gas being in the reactor and containing the products of silicon deposition. Gas mixing can also originate from the natural convection flow in the reactor. Under these conditions simultaneous process in at least two reactors, connected by a pipe system as one after another and transportation of the feeding gas mixture from the first to the last reactor provide conditions for silicon deposition from richer gas mixtures in all the reactors except for the last one than final output gas mixture. This effect is provided by the gradual depletion of the feeding gas mixture in the connected reactors. Silicon deposition in the last reactor occurs under the conditions similar to that in the reactors working in standalone mode, i.e. from the gas mixture having a composition like the output gas mixture. In the other reactors, silicon deposits from gas mixture containing more silicon.

As the result, silicon productivity in the connected reactors increases. Since outlet of a previous reactor is connected by a pipe system with inlet of the next reactor, the output gas mixture from each reactor is supplied into the next reactor and the feeding mixture passes all the reactors one-by-one. The feeding gas mixture is depleted in several steps, number of which is the number of the reactors. So, increase of the productivity is achieved owing to the first reactors and gas-to-silicon conversion is increased owing to the last reactors. Outgoing gas mixture from the last reactor is the waste product of all the reactors in the suggested method.

The advantages of the suggested method are seen already if two reactors are coupled. Use of a greater number of reactors can provide larger positive effect. But further increase of the number of connected reactors becomes senseless if the input and output gas compositions in each reactor become nearly the same due to the increase of the total gas flow rate. Besides, some negative effects, such as, for instance, dependence of all the reactors from a possible failure in one of the reactors, may arise as the number of reactors is increased very much. Choice of the number of the reactors to be connected depends on many factors and it should be made for specific plant conditions.

If the silicon is deposited accordingly to the suggested method, intensity of the gas flow in the reactors increases owing to the pumping of the total feed gas mixture through each reactor. In this case, nearly the same gas depletion in the gas bulk and at the rod surfaces is provided due to the flow intensification and turbulization by increased flow rate. As the result, the process productivity increases additionally.

Supply of increased gas flow rates into each reactor through larger number of inlets with the same velocity allows also producing more uniform gas flows in the reactors without flow intensity reduction.

Both above factors of increased flow rate through each reactor may provide additional increase of productivity and gas-to-silicon conversion.

It should be noted that the above advantages couldn't be obtained only by increasing the flow rate of the feeding gas through a stand-alone reactor. Enrichment of the gas mixture produced by the increase of the gas flow rate is accompanied inevitably by decrease of gas-to-silicon conversion from the input gas mixture in the stand-alone reactors.

There is possibility to design a stand-alone reactor in which the input gas mixture passes the reactor without mixing with the gas in the reactor volume and is gradually depleted. Growth from a gas mixture being richer than that at the reactor outlet can occur in some sections of a stand-alone reactor. For this, a tube-like flow without gas circulation in the reactor chamber should be organized. But such a reactor is not effective since the gas mixture is depleted at the deposition surfaces because of the reaction of silicon deposition and tube-like flow cannot provide intensive species transport to the growing surface. Moreover, high non-uniformity of the growth conditions along the tube will also reduce the reactor efficiency. The suggested method allows providing both positive factors: intensive gas mixing in the reactor chamber and growth from a gas mixture, which is enriched as compared with output one.

An additional possibility is to choose optimal growth conditions in each of the connected reactors working at differently depleted gas mixtures.

More intensive gas movement in the suggested method leads to an increase of heating power in each of the connected reactors for maintaining the temperature of the growth surfaces. However, simultaneous increase of the productivity allows reducing the energy consumption per 1 kg of deposited silicon, which determines the energy usage efficiency.

The highest productivity in the reactors is attained at the process end, when the deposition surface is maximal. So, the use of maximally uniform growth conditions in all the reactors is needed to provide maximal growth surfaces in all the reactors at the end of the joint deposition process. This could allow increasing the productivity and gas-to-silicon conversion additionally to the effect provided by the suggested reactor connection. Equalization of the growth conditions in connected identical reactors can be realized via periodic switches of gas pumping directions.

To provide maximal deposition area at the process end, reactors characterized by different characteristic process time in stand-alone mode can also be connected to each other in turn of decrease the characteristic process times. Reactors of different designs or reactors working at different deposition temperatures may be used for this. The deposition temperatures in the connected reactors must be increased from first reactor towards the last reactor. Different reactor designs can have different density of bodies, on which silicon is deposited, maximal possible deposition surface area, and any possible design features defining the characteristic process time for this reactor.

So, according to the above principles to get higher productivity, silicon conversion, and lower energy consumptions, an optimal reactor order can be chosen for any kind of reactors.

Use of connected identical reactors with feeding gas being pumped only in one direction also results in an increase of productivity. As it will be shown by a further example, the productivity increase as compared with separate reactors in the case of non-changed pumping direction may be about 29%.

If the flow rate of the feeding mixture supplied into first reactor is lower than $$\sum_{1}^{n} Q_i,$$

the suggested method allows increasing the gas-to-silicon conversion but does not allow considerably increasing the process productivity as compared with stand-alone reactors at input flow rates of $Q_i$. This is due to extreme depletion of the gas mixture in the last reactors. On the other hand, if the flow rate of the feeding gas is larger than $$1.5 \sum_{1}^{n} Q_i,$$

gas-to-silicon conversion becomes lower than in the separate reactors at input flow rates of $Q_i$. In each case, the optimal flow rate of the feeding gas required for all the connected reactors is determined accounting for the requirements of the whole production cycle and can be found experimentally.

The use of the suggested method for chlorosilanes as silicon-bearing gases is expedient since there is wide production practice and, on the other hand, the silicon deposition rate from chlorosilanes strongly depends on the gas depletion. Trichlorosilane is one of the most suitable gases for polycrystalline silicon production. But this gas is characterized by low maximal conversion to silicon of nearly 20-30%. Mixing of the supplied gas with the reaction products in the reactor chamber leads to the situation, when the growth in conventional reactors occurs from the gas mixture depleted by about 10% compared to the input one. This essentially decreases the process productivity.

Maximal gas-to-silicon conversion from the gas mixtures containing dichlorosilane is considerably higher, but its production cost is higher too. The use of the suggested method allows one to deposit silicon from richer gas mixtures or to replace a part of dichlorosilane by trichlorosilane in processes with dichlorosilane addition without the productivity reduction.

Additionally, the efficiency can be increased owing to: (i) use of single common apparatus for producing the feeding gas mixture and (ii) organization of thermal insulation on the pipe system between the connected reactors.

The process productivity is higher for larger deposition areas. For providing silicon deposition on increased surfaces, the use of hollow bodies or plates is useful in any kind of deposition reactors. In addition, the use of hollow bodies or plates has one more advantage for the suggested method. In this case the deposition area weakly changes during the process, remaining equal in all the connected reactors. Under these conditions, the change of the gas pumping direction is not required. So the use of hollow bodies or plates allows one to provide additional positive effect comparable with effect of change of gas pumping direction.

The suggested method has considerably lower effect if the reactors with strongly different deposition area and productivity are coupled. If $Q_i \ll Q_1, \ldots, Q_{i-1}, Q_{i+1}, \ldots Q_n$, then additional connection of i-$^{th}$ reactor weakly changes total gas flow rate and gas velocity in the other connected reactors, while changes in i-$^{th}$ low-productive reactor result in small contribution to the total effect.

PREFERRED EMBODIMENT OF THE INVENTION

Invention is illustrated by examples, which, however, do not exhaust the possibilities of the method realization. Noticeable positive result was obtained even for coupled reactors. Two identical reactors were connected by pipe system for transportation of a feeding gas mixture from one to another.

Surface of 48 silicon rods of 0.02 m in diameter was used as initial deposition surface. During the process, the diameter of the rods increased up to 0.14 m. The gas pressure was nearly equal in both reactors and it was $6 \times 10^5$ Pa. The flow rate of trichlorosilane and hydrogen mixture supplied into the first reactor was twice larger than the flow rate in the stand-alone mode for one reactor. The feeding mixture was supplied into first reactor, while the output gas mixture from first reactor was supplied into second reactor. The other operating conditions are presented in Tables 1-3.

TABLE 1

Operating conditions of one stand-alone reactor

| | | Rod diameter | | | | |
|---|---|---|---|---|---|---|
| | M | 0.02 | 0.05 | 0.08 | 0.11 | 0.14 |
| $SiCl_4$ Flow rate | Kmol/h | 0 | 0 | 0 | 0 | 0 |
| HCl Flow rate | Kmol/h | 0 | 0 | 0 | 0 | 0 |
| $SiHCl_3$ Flow rate | Kmol/h | 2 | 7.1 | 11.4 | 14.3 | 20 |
| $SiH_2Cl_2$ Flow rate | Kmol/h | 0.2 | 0.71 | 1.14 | 1.43 | 2 |
| $H_2$ Flow rate | Kmol/h | 13.2 | 23.43 | 35.11 | 40.9 | 52.8 |
| Rod surface temperature | °C. | 1150 | 1080 | 1050 | 1040 | 1030 |

TABLE 2

Operating conditions in the first of the coupled reactors

| | | Rod diameter | | | | |
|---|---|---|---|---|---|---|
| | M | 0.02 | 0.05 | 0.08 | 0.11 | 0.14 |
| $SiCl_4$ Flow rate | Kmol/h | 0 | 0 | 0 | 0 | 0 |
| HCl Flow rate | Kmol/h | 0 | 0 | 0 | 0 | 0 |
| $SiHCl_3$ Flow rate | Kmol/h | 4 | 14.2 | 22.8 | 28.6 | 40 |
| $SiH_2Cl_2$ Flow rate | Kmol/h | 0.4 | 1.42 | 2.28 | 2.86 | 4 |
| $H_2$ Flow rate | Kmol/h | 26.4 | 46.9 | 70.2 | 81.8 | 105.6 |
| Rod surface temperature | °C. | 1150 | 1080 | 1050 | 1040 | 1030 |

TABLE 3

Operating conditions in the second of the coupled reactors

| | | Rod diameters | | | | |
|---|---|---|---|---|---|---|
| | M | 0.02 | 0.05 | 0.08 | 0.11 | 0.14 |
| $SiCl_4$ Flow rate | Kmol/h | 1.28 | 3.85 | 5.84 | 7.42 | 10.1 |
| HCl Flow rate | Kmol/h | 0.163 | 0.229 | 0.334 | 0.463 | 0.617 |
| $SiHCl_3$ Flow rate | Kmol/h | 2.21 | 8.51 | 13.9 | 17.3 | 24.4 |
| $SiH_2Cl_2$ Flow rate | Kmol/h | 0.436 | 2.15 | 3.8 | 4.74 | 7.02 |
| $H_2$ Flow rate | Kmol/h | 27.2 | 48.9 | 73 | 85.3 | 110 |
| Rod surface temperature | °C. | 1150 | 1080 | 1050 | 1040 | 1030 |

Tables 1-3 show that the deposition processes were carried out at equal deposition temperatures for equal rod diameters both in coupled and separate reactors. The gas flow rate was increased with rod diameter increase. The output gas mixture containing deposition products HCl, $SiCl_4$, and also $SiH_2Cl_2$, produced in the gas phase, was supplied into the second reactor. The direction of the gas pumping was changed several times, what results in nearly equal rod diameters in the coupled reactors.

TABLE 4

Comparison of the reactor characteristics. The gas flow rate into the coupled reactors is equal to doubled gas flow rate for a stand-alone reactor.

| | | Rod diameters, m | | | | |
|---|---|---|---|---|---|---|
| | | D = 0.02 | D = 0.05 | D = 0.08 | D = 0.11 | D = 0.14 |
| First from coupled reactors | Productivity, kg/h | 13.2 | 31.3 | 43.6 | 56.2 | 71.8 |
| | Energy consumptions kWh/kg | 106 | 74.9 | 67.9 | 60.8 | 55.2 |
| | Si conversion, % | 11.1 | 7.1 | 6.2 | 6.4 | 5.8 |
| Second from coupled reactors | Productivity, kg/h | 9.3 | 23.2 | 33.1 | 42 | 54.2 |
| | Energy consumptions kWh/kg | 152 | 97.9 | 83.9 | 75.1 | 64.3 |
| | Si conversion, % | 8.4 | 5.7 | 5.0 | 5.1 | 4.7 |
| Average characteristics of coupled reactors | Productivity, kg/h | 11.3 | 27.3 | 38.4 | 49.1 | 63 |
| | Energy consumptions kWh/kg | 125.8 | 84.8 | 75.3 | 67.0 | 59.1 |
| | Si conversion, % | 18.6 | 12.4 | 10.9 | 11.2 | 10.2 |
| Separate reactor | Productivity, kg/h | 9.4 | 22.8 | 32 | 41.3 | 53.1 |
| | Energy consumptions kWh/kg | 136 | 90.9 | 78.7 | 69.8 | 60.6 |
| | Si conversion, % | 15.2 | 10.4 | 9.1 | 9.3 | 8.6 |
| Comparison of coupled and separate reactors | Change of productivity, % | +20 | +20 | +20 | +19 | +19 |
| | Change of energy consumptions, % | −7 | −7 | −4 | −4 | −2 |
| | Change of Si conversion, %, | +3.4 | +2 | +1.8 | +1.9 | +1.6 |

TABLE 5

Comparison of the reactor characteristics. The gas flow rate into the coupled reactors is equal to tripled gas flow rate for a stand-alone reactor. Thermal insulation of the gas directed into the second reactor is applied.

| | | Rod diameters, m | | | | |
|---|---|---|---|---|---|---|
| | | D = 0.02 | D = 0.05 | D = 0.08 | D = 0.11 | D = 0.14 |
| First from coupled reactors | Productivity, kg/h | 15.5 | 36 | 49.6 | 64 | 81.1 |
| | Energy consumptions kWh/kg | 94.7 | 69.8 | 64.9 | 58.7 | 54.4 |
| | Si conversion, % | 8.4 | 5.5 | 4.7 | 4.8 | 4.4 |
| Second from coupled reactors | Productivity, kg/h | 12 | 28.5 | 39.7 | 50.7 | 65.1 |
| | Energy consumptions kWh/kg | 124 | 83.3 | 72.6 | 65 | 56.5 |
| | Si conversion, % | 7.05 | 4.6 | 3.9 | 4.0 | 3.7 |
| Average characteristics of coupled reactors | Productivity, kg/h | 13.8 | 32.3 | 44.7 | 57.4 | 73.1 |
| | Energy consumptions kWh/kg | 107.6 | 75.7 | 68.3 | 61.5 | 55 |
| | Si conversion, % | 14.9 | 9.8 | 8.4 | 8.6 | 7.9 |
| Separate reactor | Productivity, kg/h | 9.4 | 22.8 | 32 | 41.3 | 53.1 |
| | Energy consumptions kWh/kg | 136 | 90.9 | 78.7 | 69.8 | 60.6 |
| | Si conversion, % | 15.2 | 10.4 | 9.1 | 9.3 | 8.6 |
| Comparison of coupled and separate reactors | Change of productivity, % | +47 | +42 | +40 | +39 | +38 |
| | Change of energy consumptions, % | −21 | −17 | −13 | −12 | −9 |
| | Change of Si | −0.3 | −0.6 | −0.7 | −0.7 | −0.7 |

TABLE 5-continued

Comparison of the reactor characteristics. The gas flow rate
into the coupled reactors is equal to tripled gas flow rate
for a stand-alone reactor. Thermal insulation of the gas
directed into the second reactor is applied.

| | Rod diameters, m | | | | |
|---|---|---|---|---|---|
| | D = 0.02 | D = 0.05 | D = 0.08 | D = 0.11 | D = 0.14 |
| conversion, %, | | | | | |

TABLE 6

Comparison of the reactor characteristics. The gas flow
rate into the coupled reactors equal to is tripled gas flow
rate for a stand-alone reactor. Thermal insulation of the
gas directed into the second reactor is not applied.

| | | Rod diameters, m | | | | |
|---|---|---|---|---|---|---|
| | | D = 0.02 | D = 0.05 | D = 0.08 | D = 0.11 | D = 0.14 |
| First from coupled reactors | Productivity, kg/h | 15.5 | 36 | 49.6 | 64 | 81.1 |
| | Energy consumptions kWh/kg | 94.7 | 69.8 | 64.9 | 58.7 | 54.4 |
| | Si conversion, % | 8.4 | 5.5 | 4.7 | 4.8 | 4.4 |
| Second from coupled reactors | Productivity, kg/h | 11.7 | 28.5 | 41.1 | 50.9 | 65.9 |
| | Energy consumptions kWh/kg | 126 | 88 | 79.9 | 73.4 | 66.6 |
| | Si conversion, % | 6.9 | 4.6 | 4.0 | 4.0 | 3.7 |
| Average characteristics of coupled reactors | Productivity, kg/h | 13.6 | 32.3 | 44.9 | 57.5 | 73.5 |
| | Energy consumptions kWh/kg | 108 | 77.8 | 71.7 | 65.2 | 59.9 |
| | Si conversion, % | 14.7 | 9.8 | 8.5 | 8.6 | 8.0 |
| Separate reactor | Productivity, kg/h | 9.4 | 22.8 | 32 | 41.3 | 53.1 |
| | Energy consumptions kWh/kg | 136 | 90.0 | 76.7 | 69.8 | 60.6 |
| | Si conversion, % | 15.2 | 10.4 | 9.1 | 9.3 | 8.6 |
| Comparison of coupled and separate reactors | Change of productivity, % | +45 | +42 | +40 | +39 | +38 |
| | Change of energy consumptions, % | −21 | −14 | −9 | −7 | −1 |
| | Change of Si conversion, %, | −0.5 | −0.7 | −0.6 | −0.7 | −0.6 |

Based on the data in Table 4, one can conclude that the use of coupled reactors as compared with a stand-alone reactor can result in considerable increase of productivity, gas-to-silicon conversion and decrease of energy consumption per 1 kg of deposited silicon.

Table 5 shows that the gas flow rate increased by 1.5 times compared to the total flow rate required for operation of two reactors in stand-alone mode allows increasing productivity as compared with separate reactor nearly up to 40% and decrease of the energy consumptions by about 13%. At that, gas-to-silicon conversion becomes nearly the same as in stand-alone reactor.

Effect of the change of the gas pumping direction can be estimated from the data in Tables 4 and 5. It is seen that growth rate in second reactor is lower than in first reactor by 20-30% at equal deposition areas. Then the rod diameter in second reactor in the process with non-changed pumping directions will be smaller than in first reactor maximally by 20-30%. The total amount of deposited silicon in two reactors at the process end is smaller by $(0.75^2+1)/2 \cdot 100\% = 22\%$. The process time without the change of pumping direction is shorter by $25/2=12.5\%$. So the process productivity is $78\%/0.875=89\%$, i.e. the productivity decreases by 11% in the processes without the change of the gas pumping direction as compared with the coupled reactors and changed pumping direction, where productivity increase is about 40%. Hence, productivity increase in coupled reactors without change of pumping direction as compared with separate reactor is about 40%−11%=29%.

If hollow bodies or plates are used, the productivity increase of nearly 11% (similar to the change of pumping direction) is expected additionally to the effect of increase of initial deposition surfaces, which is observed in stand-alone mode as well.

A decrease of rod surface temperature in first reactor also may provide equal deposition rates in coupled reactors. Negative profit resulting from some decrease of the growth rate in first reactor may be compensated by increase of polycrystalline silicon quality grown under lower temperatures.

Tables 5 and 6 show that thermal insulation of the gas flow between the reactors reduces energy consumptions per 1 kg of silicon.

The suggested method is recommended to use in production of polycrystalline silicon since it allows increasing the process profitability without serious reconstruction of the reactors.

I claim:

1. Polycrystalline silicon production method comprising:
   supplying a gas mixture containing silicon-bearing gas into reactors through a pipe system;
   heating bodies inside the reactor for silicon deposition on their surfaces with formation of output gas mixture in the reactor volume;
   using two or three reactors simultaneously for silicon deposition, wherein the outlet of a previous reactor is connected by pipe system with the inlet of the next reactor as one after another;
   transporting all the feeding gas mixture through these reactors one-by-one beginning from the first to the last reactor; wherein the flow rate of silicon-bearing gas into the first reactor is determined as $$\sum_{i}^{n} Q_i \le Q \le 1.5 \sum_{i}^{n} Q_i \qquad (1)$$

where $Q_i$ is the silicon-bearing gas flow rate supplied into $i^{th}$-reactor in the standalone mode, n is number of the connected reactors.

2. The method of claim 1 further comprising changing order of the gas transportation to the opposite one at least once during the process.

3. The method of claim 1 further comprising transporting the silicon-bearing gas mixture through the reactors with different characteristic process times in the standalone mode in such an order that the reactor having longest process time serves as the first one, reactors having successively decreasing process times are used as the successive reactors, and reactor having shortest process time serves as the last one.

4. The method of claim 1 wherein the deposition temperature in each reactor is higher than in the previous one.

5. The method of claim 1 wherein silicon-bearing gas is dichlorosilane, trichlorosilane, tetrachlorosilane or their mixture.

6. The method of claim 1 further comprising preparing the silicon-bearing gas mixture, required for all connected reactors, in one common apparatus.

7. The method of claim 1 wherein the pipe system is equipped with thermal insulation.

8. The method of claim 1 wherein the heating bodies are hollow.

9. The method of claim 1 wherein the heating bodies are plates.

* * * * *